April 29, 1958 C. W. BRABENDER 2,832,215
MOISTURE CONTENT OF MATERIALS DETERMINING APPARATUS
Filed Jan. 21, 1954 2 Sheets-Sheet 1
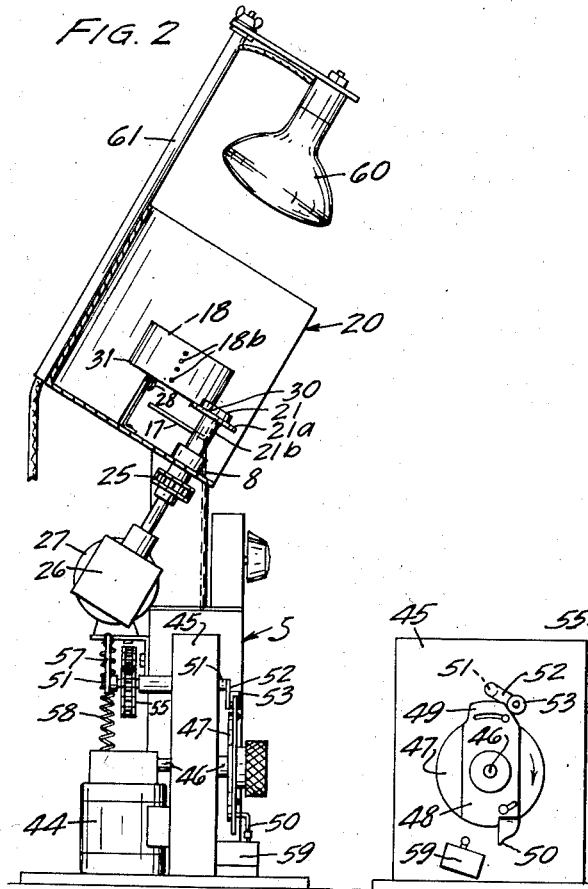
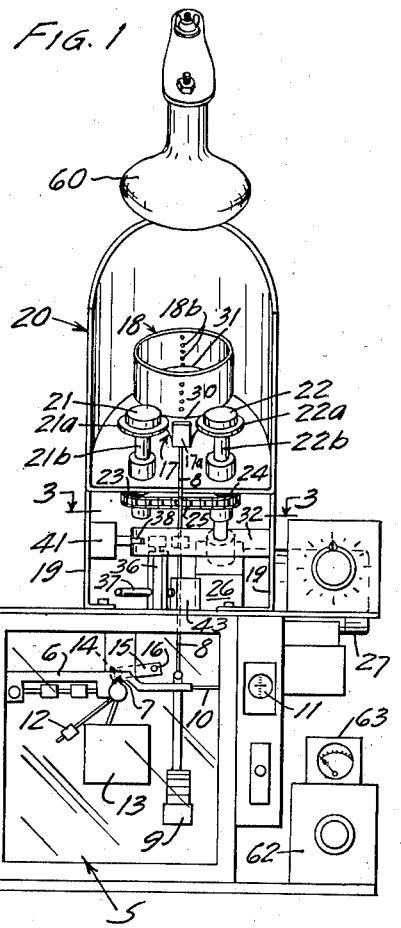
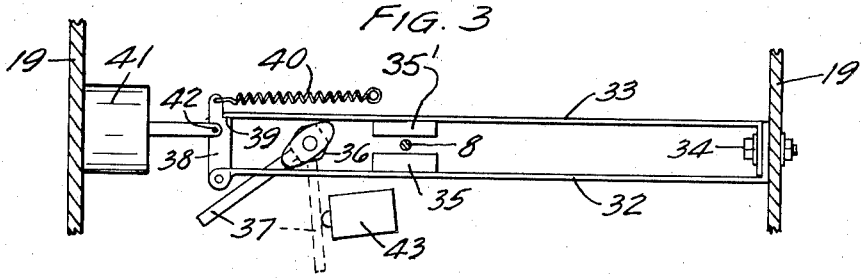
Inventor
Carl W. Brabender
By
Williamson, Williamson, Schroeder & Adams
Attorneys April 29, 1958 C. W. BRABENDER 2,832,215
MOISTURE CONTENT OF MATERIALS DETERMINING APPARATUS
Filed Jan. 21, 1954 2 Sheets-Sheet 2

Inventor
Carl W. Brabender
By Williamson, Williamson, Schroeder & Adams
Attorneys United States Patent Office 2,832,215
Patented Apr. 29, 1958

2,832,215

MOISTURE CONTENT OF MATERIALS DETERMINING APPARATUS

Carl W. Brabender, Minneapolis, Minn., assignor to Pillsbury Mills, Inc., Minneapolis, Minn., a corporation of Delaware Application January 21, 1954, Serial No. 405,488

5 Claims. (Cl. 73—76)

This invention relates to moisture determining apparatus. More particularly, it relates to apparatus for quickly and efficiently driving off the volatile contents of a sample of material and determining the percentage of loss of weight by the sample as a consequence thereof.

A serious problem in the cereal industries which has existed for many years has been the requirement for apparatus which will determine the moisture content of granulated material such as flour, quickly and accurately. Accurate methods have been known previously but all of these methods have had the serious drawback of requiring almost prohibitive amounts of time to complete the determinations. In later years, the use of infra-red heat in making such determinations has been investigated because of the penetrating characteristics of that type of heat. Associated with the use of infra-red heat, however, is the problem of preventing scorching of the granulated material. This problem, of course, exists when any type of intense heat is used. I have found that constant agitation of the upper surface of the material, the moisture content of which is to be determined, precludes scorching since such material will not scorch so long as there is moisture present at the surface of the material for evaporation, because the evaporation of moisture and the consequent absorption of heat will keep the temperature of the material below the combustion temperature. In the past, I have invented moisture determining apparatus which utilizes stirrers to accomplish the agitation of the upper surface of the material as is disclosed and claimed in my prior application for patent entitled "Liquid Content Determining Method and Apparatus," Serial No. 205,258, filed by me on January 10, 1951, now Patent No. 2,709,914. Such stirrers have been teflonized in order to preclude portions of the sample of the material from clinging to the stirrer element. I have also arranged to have such a stirrer jarred as disclosed and claimed in my application referred to above. However, some scientists refused to accept the conclusion that no material is lost as a result of the withdrawal of such a stirrer from the sample prior to the weighing operation. My present invention is directed toward providing a moisture determining apparatus which will accomplish the moisture determining operation in as little time as is possible when a stirrer is used and which will, at the same time, obviate the objections of such scientists.

In addition to the above, there has always been the problem of precluding the sample from absorbing moisture from the air during the period between the completion of the drying operation and the weighing operation. In order to prevent such absorption, the determinations have previously been carried on within enclosed compartments. My invention is also directed toward eliminating the need for enclosing the sample within a compartment during the period immediately prior to the weighing operation.

It is a general object of my invention to provide novel and improved moisture determining apparatus.

A more specific object is to provide novel and improved moisture determining apparatus which will complete the moisture determining operation in a minimum period of time and yet clearly will not introduce any inaccuracies through the insertion and withdrawal of a stirring element in the sample of material.

Another object is to provide moisture determining apparatus which will complete the moisture determining operation in a minimum period of time by rotating the sample pan about an upright but inclined axis while disposed beneath a source of intense dry heat.

Another object is to provide a novel and improved moisture determining apparatus which will permit the determination of the moisture content of a sample without the sample being enclosed within an enclosure and without introducing any inaccuracies as a result of moisture absorption from the air.

Another object is to provide moisture determining apparatus which will utilize the effects of gravity to provide sufficient agitation of the sample to preclude scorching of the sample despite the use of a very intense dry heat to accomplish the drying operation.

These and other objects and advantages of my invention will more fully appear from the following description made in connection with the accompanying drawings, wherein like reference characters refer to the same or similar parts throughout the several views, and in which:

Fig. 1 is a front elevational view of one embodiment of my invention;

Fig. 2 is a side elevational view of the same;

Fig. 3 is a horizontal sectional view on an enlarged scale taken along line 3—3 of Fig.1;

Figure 4:
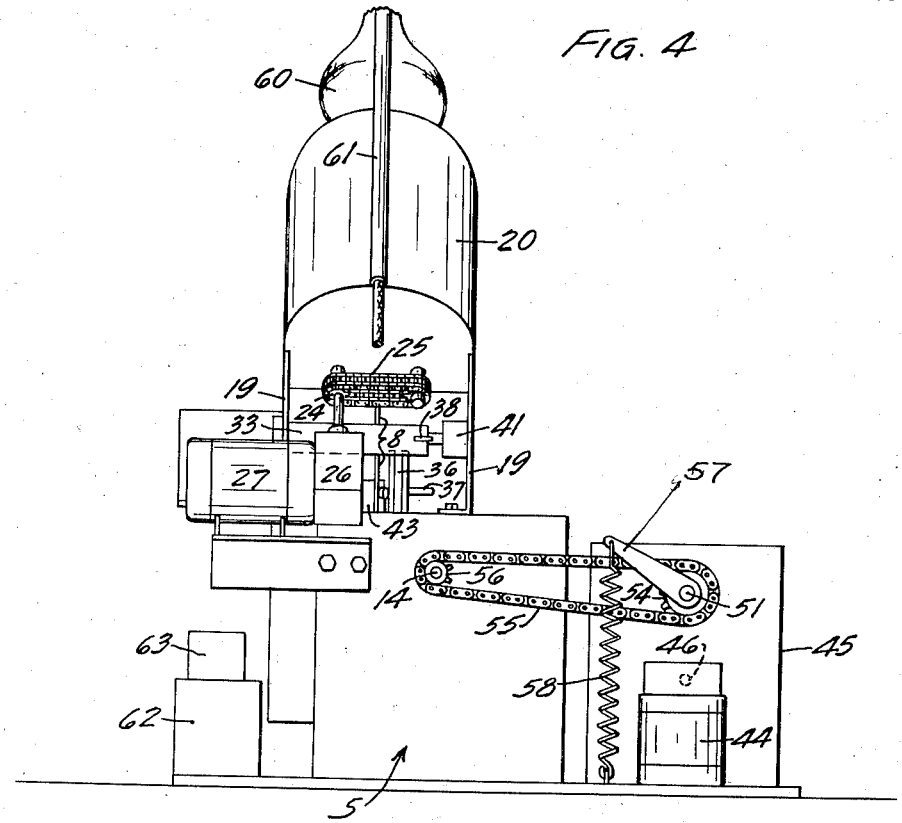
Fig. 4 is a rear elevational view of the same.

One embodiment of my invention, as shown in Figs. 1–5, may include a weighing mechanism or scale S which is encased in a substantially closed compartment to prevent air currents from influencing the same. This weighing mechanism or scale S is comprised of a steel yard or beam 6 which is pivoted as at 7 and which is provided at its right hand end as viewed in Fig. 1 with a pan carrier support or rod 8 and a dependent counter-weight 9. As shown, the pan carrier support 8 is pivotally mounted on the right hand end of the steel yard 6. Extending laterally from the right hand end portion of the steel yard 6 is an indicating arm 10 which will provide a direct scale reading on the moisture percentage indicator 11. The steel yard 6 is provided, as shown, with a counterbar 12 and a dampener 13. The pan carrier support rod 8 extends upwardly through the wall of the compartment in free sliding relation thereto. The scale S is preferably of the type disclosed in my prior United States Letters Patent No. 2,047,765, entitled "Apparatus for the Determination of Moisture," and issued July 14, 1936.

Extending inwardly through the back wall of the closed compartment is a shaft 14 which is mounted therein for rotation about its longitudinal axis and which has mounted thereon a lever 15 which extends laterally from the shaft. The lever 15 has a forwardly extending control arm 16 which extends forwardly above the right hand end portion of the beam or steel yard 6 so that when the shaft 14 is pivoted so as to cause the lever 15 to descend, the control arm 16 will engage the beam 6 and lower the right hand end portion thereof and will also lower the pan carrier support 8.

Figure 5:
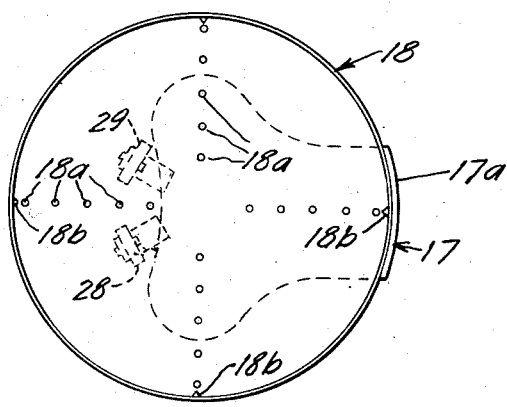
Fig. 5 is a plan view on an enlarged scale of the sample pan with the pan carrier shown in broken lines.

Carried by the upper end portion of the pan carrier support rod 8 is a pan carriers 17 which is adapted to engage and support a sample pan 18. As best shown in Fig. 5, the sample pan carrier 17 is comprised of a flat plate which is generally T-shaped and extends rearwardly and slightly upwardly on an inclined plane from the pan carrier support rod 8. Extending upwardly from the lower forward end of the plate 17 is a flange or cradling member 17a which is shaped concentrically with the side wall of pan 18 so as to complement the shape thereof. This can best be seen in Fig. 5 which readily shows that the entire pan carrier 17 is complementary in shape to the pan 18 so that when the pan carrier 17 is lifted from a position directly below the pan, the latter will be firmly supported by the pan carrier 17.

Mounted on the top of the scale S and extending upwardly therefrom is a framework 19 which supports a shell 20. Rotatably mounted on this shell 20 is a pair of laterally spaced flanged roller elements 21 and 22. The flanges 21a and 22a of these roller elements extend outwardly adjacent the lower end portions of the rollers and have their upper surfaces extending in a plane parallel to the plane of the T-shaped portion of the pan carrier 17. The shafts 21b and 22b upon which these rollers are mounted, extend downwardly through the shell 20 upon which they are rotatably mounted and carry sprocket gears 23 and 24 at their lower respective ends. These gears are drivably connected by a sprocket chain 25. The shaft 22b extends downwardly to a low level where it is driven through a gear element 26 by a variable speed electric driving motor 27.

Mounted upon the shell 20, as best shown in Figs. 2 and 5, is a pair of rollers 28 and 29. These rollers 28 and 29 are mounted for free rotation about inclined axes which extend outwardly from a central point between these two rollers and the two rollers 21 and 22. This central point is preferably directly below the center of the pan 18 when the latter is positioned as shown in Figs. 1 and 2. The upper surfaces of these rollers extend in the same general inclined plane as the upper surfaces of the flanges 21a and 22a of the rollers 21 and 22 so that they cooperatively provide a support for the pan 18 on an inclined plane.

The pan 18, as best shown in Fig. 5, is provided with a plurality of deformations in the form of upwardly extending teats 18a which are formed in the bottom portion of the pan. Some inwardly extending teats 18b are also formed on the vertical side walls of the pan. These teats 18a and 18b insure that even the most free-flowing of granular materials will be carried along with the bottom portion of the pan 18 from the lower portion of the bottom of the pan as at 30 to the upper portion of the bottom of the pan as at 31 during the rotation of the pan. A sample of granular material placed within the pan 18 will, upon rotation of the pan, have portions thereof carried along the upwardly inclined plane until gravity will cause the same to roll downwardly to the lower portions. In this manner, any sample placed within the pan and rotated therewith will have its upper surface constantly agitated and exchanged so that different portions of the sample will be constantly presented to the source of heat.

Mounted on the upper surface of the scale S on opposite sides of and extending normally to the pan carrier support 8, is a pair of spring metal clamping straps 32 and 33 which are so mounted as at 34 to cause the two to be constantly urged toward each other. A pair of brake blocks 35 and 35' are carried by this pair of spring metal straps 32 and 33 on opposite sides of the pan carrier support 8. This can best be seen in Fig. 3. Rotatably mounted upon the upper surface of the scale S below and extending upwardly between the straps 32 and 33, is a cam post 36. This cam post 36 has a lever handle 37 extending outwardly therefrom with which the cam post may be rotated. As best shown in Fig. 3, the cam post 36 is somewhat elliptical in shape so that when the handle 37 is in the dotted line position shown in Fig. 3, the spring blocks 34 and 35 will be held in spaced relation to the pan carrier support 8. When the cam post is in the position shown in full lines in Fig. 3, the spring straps 32 and 33 will cause the spring blocks 34 and 35 to engage the pan carrier support 8 and clamp it fixedly relative thereto upon the release of the trip element to be hereinafter described.

Pivotally mounted upon the free end of the spring strap 32, as best shown in Fig. 3, is a trip element or catch 38 which has an indentation or latch element formed therein as at 39. A spring 40 urges the trip element 38 toward the pan carrier support 8. An electromagnet 41 is mounted upon the support 19 and is pivotally connected as at 42 to the trip element 38.

Mounted upon the upper wall of the compartment enclosing the scale and adjacent to the handle 37 in position to be engaged thereby when the handle is swung to the dotted line position shown in Fig. 1, is a starting switch 43. This starting switch is connected to the driving motor 27 to start the same and is also connected to a running motor and an infra-red lamp to be hereinafter referred to.

Positioned adjacent the compartment enclosing the scale S is a variable timing motor 44. This timing motor has its shaft extending into a gear box 45 which in turn has a shaft 46 extending outwardly from the opposite side thereof. A disc 47 is mounted on the shaft 46 and outwardly of the disc, and on the shaft 46 is mounted a cam block 48. The cam block carries a relatively broad cam 49 and a relatively narrow cam 50 at opposite ends of the block. The cam 50 is offset relative to the cam 49.

Extending through the housing of the gear box 45 is a shaft 51 which has a small lever 52 connected thereto, the latter carrying a roller 53 at the outer end portions thereof. The roller 53 is positioned so as to be engaged by the cam 49 as it rotates with the shaft 46. On the opposite and back side of the gear box mounted on the shaft 51 is a sprocket gear 54. This gear 54 is connected by a chain 55 to a second sprocket gear 56 which is carried on the end of the shaft 14 which extends through the back of the scale-encasing compartment. A lever 57 is mounted on the shaft 51 and is constantly drawn downwardly by a spring 58.

Mounted on the gear casing 45 on the forward side thereof is a running, single pole, double throw switch 59 positioned so as to be engaged by the sharp cam 50 as it rotates with the shaft 46. This switch 59 is in parallel with the starting switch 43 so that either will close the circuit to the driving motor 27, the timing motor 44 and the source of heat to be applied to the sample. This source of heat, as shown, is an infra-red lamp 60 mounted on a rod 61 upon the shell 20. The rod 61 is pivotable about its longitudinal axis so that the lamp 60 may be swung to either side as desired. The source of power to the lamp 60 is regulated by means of a variable transformer 62 and a volt meter 63 which will indicate any fluctuations in the voltage so that the determinations may always be made, if so desired, at the same voltage.

In operation, a sample of a predetermined weight is placed within the sample pan 18 and the pan is placed so that its bottom will rest upon the flanges 21a and 22a of the rollers 21 and 22 and upon the upper surface of the rollers 28 and 29. The lever 37 is then swung to the dotted line position shown in Fig. 3 so as to provide power to the driving motor 27 and the infra-red lamp 60 as well as the timing motor 44. The timing motor thereupon will cause the cam block to rotate with the shaft 46 so that the cam 50, which at the termination of the previous run engaged the switch 59, will move away from the switch and permit that switch to close the running circuit to the driving motor 27, the timing motor 44 and the lamp 60.

The driving motor 27 will drive the roller 22 and cause the pan 18 to turn with that roller and upon the other three rollers 21, 28 and 29. The chain 25 between the rollers 21 and 22 will drive the roller 21 so that that roller will aid in rotating the pan 18 about its inclined but upright axis. While so rotating, portions of the sample will be carried around with the pan to the more upper portions as at the point 31, and gravity acting thereupon will cause the sample portions to roll downwardly toward the rollers 21 and 22. In this manner, all portions of the sample will be constantly and continuously agitated and the portions thereof which comprise the upper surface of the sample will be carried downwardly and covered up by portions of the sample which previously were below the upper surface thereof. The steady rolling and mixing of the sample constantly changes the upper surface and presents the portions of the sample bearing the greater percentage of moisture to the heat rays of the lamp 60. In this manner, scorching is prevented despite the fact that a very intense heat is utilized.

Toward the end of the drying operation, the cam block 48 will have reached the position shown in Fig. 1, the direction of rotation being shown by the arrow in that figure. As it rotates, the roller 53 will ride upwardly on the beveled edge of the cam block 49 as shown in Fig. 1, thereby causing the lever 52 to swing upwardly and the shaft 51 to rotate in a counter-clockwise direction when viewed from the front of the apparatus. This rotation of the shaft 51 causes the lever 57 to swing upwardly against the tension of the spring 58. At the same time, the gear 54 will turn and by means of the chain 55 will cause the gear 56 to also turn to rotate the shaft 14. Rotation of the shaft 14 will cause the lever 15 and the control arm 16 to swing upwardly and release the beam or steel yard 6 so that the right hand end portion thereof as viewed in Fig. 1 may swing upwardly. The upward movement of the right hand end portion of the steel yard will cause the pan carrier support 8 to rise therewith and will cause the pan carrier 17 to engage the pan 18 and lift the same upwardly, free of the rollers 21, 22, 28 and 29. This brings the scale into operation and causes the scale to weigh the pan and the sample. The indicator 10 will show upon the moisture percentage indicator 11 in direct reading, the percentage of the sample which was lost as a result of the drying operation. Through this weighing operation, the lamp 60 remains energized so that no moisture may be absorbed from the air by the sample and hence no inaccuracies are introduced with such absorption.

A brief interval exists between the time when the pan carrier support 17 engages the pan 18 and lifts the same and the scale is brought into operation, and the time when the narrow cam 50 engages the switch 59. During that interval, the scale has an opportunity to come to balance at the proper weight. By the time the beam 6 has ceased to swing about its pivot and has come to rest at the correct weight indication, the cam 50 will engage the switch 59 and break the circuit to the driving motor 27, the timing motor 44 and the infrared lamp. At the same time, this switch closes the circuit to the electromagnet 41 and thereby energizes the same. Energization of the electromagnet 41 causes the trip element 38 to be drawn away from the pan carrier support 8, thereby permitting the break blocks 34 and 35 to move toward each other and positively engage the pan carrier support 8 and hold the same tightly therebetween at a fixed position. This, of course, locks the scale in the weighed position and preserves the results of the determination until the operator returns and commences a new determination. This means that the cam 50 at the end of the determination comes to rest in engaging relation with the switch 59 and the scale is locked in its last weighing position. The operator can commence any given determination and then leave the apparatus and return any number of hours later to find the accurate results of the determination preserved for him.

When the next determination is started, the operator merely moves the lever 37 to the dotted line position shown in Fig. 3, whereupon the cam 36 will spread the spring straps 32 and 33 and the spring 40 and draw the trip element 38 therebetween to maintain them in spread position until the electromagnet 41 is subsequently energized as described above. The operator needs only hold the lever 37 against the switch 43 until such time as the timing motor 44 has driven the cam 50 out of engagement with the driving switch 59 and thereafter he may release the lever 37 since the driving switch will maintain the circuits to the driving motor and the timing motor as well as the lamp throughout the remainder of the drying operation.

One principle advantage of my invention is that there is no possibility of any portion whatsoever of the sample being withdrawn from the sample pan as a result of the sample agitating operation while the determination is being conducted. This is true, of course, because there is no stirring element inserted into the sample. The desired agitation of the sample is accomplished through the utilization of the rotation of the sample pan 18 while the same is maintained upon a rotatable support which is inclined.

Another advantage is that the results of any particular determination will be automatically preserved for the operator despite the fact that he may leave the apparatus while it is in operation and fail to return before the determination is completed. When the determination is completed with my apparatus, the results thereof are preserved through the use of the automatically energized clamping device which locks the scale in the weighing position.

Another advantage of my device is that the determination may be conducted completely outside of any enclosure, for there is no possibility of the sample absorbing moisture during the period between the termination of the drying operation and the weighing operation.

Thus it can be seen that I have provided novel and improved apparatus for obtaining a highly accurate determination of the moisture content of a sample within a very short period of time. The moisture content of a sample of flour, for example, may be determined within a period of three to five minutes with this apparatus, and there is no possibility of any inaccuracies being introduced through the use of a mechanical stirrer.

It will be noted that the speed of rotation of the pan 18 may readily be varied as desired in accordance with the nature and texture of the material to be dried. It is also possible to vary the speed of rotation of the pan during the various stages of a single determination. This variation in speed of rotation of the pan 18 may be obtained, of course, through adjustment of the variable speed motor 27. It will also be noted that the angle of inclination from vertical of the axis of rotation of the pan 18, as shown in Fig. 1, is approximately thirty (30) degrees for use in the drying of wheat flour. It will be readily appreciated that the angle of inclination of the axis of rotation of the pan 18 may be varied in accordance with the nature and texture of the material to be dried and the speed of rotation used. The angle of inclination and the speed of rotation, in any event, must be so correlated as to cause the material to be dried to be carried upwardly at least part way toward the uppermost elevation of the bottom of the pan 18 as it rotates and to thereupon roll downwardly to the lowermost portions of the bottom of the pan, thereby accomplishing a constant stirring and mixing of the material to be dried.

It will, of course, be understood that various changes may be made in the form, details, arrangement and proportions of the various parts without departing from the scope of my invention.

What is claimed is:

1. Apparatus for quickly driving off the volatile contents of a sample of pulverulent material without scorching the same, comprising a plurality of rotatable support elements having during rotation upper surfaces which extend in an inclined plane and are adapted to receive a sample pan thereon and to rotatably support the same with the bottom thereof in inclined position, mechanism for drivably rotating at least one of such rotatable support elements to cause such a pan to rotate about a generally upright and inclined axis when so supported so that the granular material contained therewithin will travel through an arc of rotation with said bottom in an upwardly inclined direction and will then roll back downwardly and thereby be continuously agitated, and a source of dry heat disposed above and adjacent to said support elements and directed downwardly toward the same so as to dry the contents of a sample pan when the same is supported by said support elements.

2. Apparatus for quickly driving off the volatile contents of a sample of pulverulent material without scorching the same comprising, a plurality of rotatable support elements having during rotation upper surfaces which extend in an inclined plane and are adapted to receive a sample pan thereon and to rotatably support the same with the bottom in said plane, means on at least some of said rotatable elements for preventing such a pan from sliding downwardly off the same, mechanism for drivably rotating at least one of said rotatable support elements to cause such a pan to rotate about a generally upright and inclined axis so that such pulverulent material will travel through a restricted arc of rotation with the inclined bottom of the pan in an upwardly inclined direction and will thereafter tumble back down and thereby be continuously agitated and a source of dry heat disposed above and adjacent to said support elements and directly downwardly toward the same so as to dry the contents of a sample pan when the same is supported by said support elements.

3. In apparatus for use in quickly driving off the volatile contents of a sample of pulverulent material without scorching the same while contained within a sample pan, the combination of a plurality of roller elements rotatably mounted adjacent each other for rotation about respective axes extending to a point disposed centrally of and between said rollers, said rollers during rotation having their uppermost portions disposed in a single inclined plane and being adapted to in part rotatably support such a pan having a sample of such pulverulent material therewithin, at least a pair of flanged roller elements rotatably mounted adjacent said first mentioned roller elements and adapted to support such a pan with its flanges in said plane, mechanism for drivably rotating at least one of said flanged roller elements to rotate such a pan about a generally upright but inclined axis which intersects the axes of said first mentioned roller elements at their common point, and a source of dry heat disposed above and adjacent to said roller elements and directed downwardly toward the same so as to dry the contents of such a pan when the latter is so supported.

4. Apparatus for use with weighing mechanism in quickly determining the moisture content of a sample of granular material, said apparatus comprising a pan adapted to receive therewithin upon the bottom thereof a sample of granular material the moisture content of which is to be determined, rotatable support structure supporting said pan and rotating the same about an inclined axis to incline the bottom of the pan in rotation so that the granular material will travel through an arc of rotation with said bottom in an upwardly inclined direction and will then roll back down and thereby be continuously agitated, a source of dry heat disposed above said pan while so supported and directed downwardly into the interior of said pan to dry the contents thereof, an inclined auxiliary support below the pan for engaging the inclined bottom of the pan, said inclined auxiliary support having a lower end, and an upstanding cradle member secured to the lower end of said auxiliary support for engaging and retaining the pan thereon, said auxiliary support being vertically shiftable for interchangeably lifting the pan off and dropping the pan on the rotatable support structure while maintaining the pan in an inclined position, said auxiliary support being connectible with said weighing mechanism in weight-transmitting relation, whereby the pan will be continuously maintained in an inclined position to facilitate rapid interchange between successive weighing and drying operations.

5. Apparatus for quickly determining the moisture content of a sample of granular material, said apparatus comprising a sample pan adapted to receive therewithin a sample of pulverulent material the moisture content of which is to be determined, rotary means supporting the pan in an inclined position and rotating the same about an inclined axis, said means including at least three spaced rollers having pan-supporting surfaces disposed in an inclined plane for engaging the bottom of the pan, two of said rollers being disposed below the third roller and said two rollers having generally upright surfaces engaging the pan side wall in cradling relation and preventing the pan from slipping off the rollers, whereby the granular material is agitated by tumbling as the pan is rotated, a drying media directed downwardly into the pan and applied to the granular material therein as the same is agitated, and a weighing mechanism including an inclined support connected with the mechanism in weight-transmitting relation, said support having an upright retaining element for holding the pan thereon in an inclined position, and said support being vertically shiftable for lifting the pan off the rollers to transmit weight to the weighing mechanism and for dropping the pan on the rollers to be rotated thereby whereby to facilitate rapid interchange between the weighing operation and the drying and agitating operation.

References Cited in the file of this patent

UNITED STATES PATENTS

| | | |
|---|---|---|
| 1,051,494 | Etherington | Jan. 28, 1913 |
| 1,945,196 | Kelly | Jan. 30, 1934 |
| 2,047,765 | Brabender | July 14, 1936 |
| 2,123,394 | Anderson | July 12, 1938 |
| 2,328,256 | Breckenridge | Aug. 31, 1943 |
| 2,510,858 | Black | June 6, 1950 |